United States Patent [19]

Zbinden

[11] Patent Number: 4,930,404
[45] Date of Patent: Jun. 5, 1990

[54] VERY HIGH PRESSURE PISTON PUMP

[76] Inventor: Fritz Zbinden, Dorfstrasse, CH-8479 Oberwil, Switzerland

[21] Appl. No.: 252,279
[22] PCT Filed: Dec. 16, 1987
[86] PCT No.: PCT/EP87/00786
   § 371 Date: Aug. 19, 1988
   § 102(e) Date: Aug. 19, 1988
[87] PCT Pub. No.: WO88/04731
   PCT Pub. Date: Jun. 30, 1988
[51] Int. Cl.$^5$ ............................................. F01B 31/14
[52] U.S. Cl. .......................................... 92/60.5; 92/153; 92/155; 92/156; 92/158; 384/317; 384/627
[58] Field of Search ................. 92/60.5, 153, 155, 158, 92/159, 160, 169.1, 170.1, 171.1, 156; 384/315, 317, 319, 627; 418/83

[56] References Cited

U.S. PATENT DOCUMENTS

| 3,333,907 | 8/1967 | Lamb. | |
|---|---|---|---|
| 3,612,713 | 10/1971 | Eggins et al.. | |
| 4,023,866 | 5/1977 | Antencio | 384/319 |
| 4,220,006 | 9/1980 | Kinot | 92/98 R |
| 4,343,055 | 8/1982 | Bergling | 384/455 |
| 4,500,215 | 2/1985 | Rusboldt | 384/627 |
| 4,729,145 | 3/1988 | Egner-Walter et al. | 384/16 |

FOREIGN PATENT DOCUMENTS

| 629082 | 9/1963 | Belgium. | |
|---|---|---|---|
| 1229801 | 6/1967 | Fed. Rep. of Germany. | |
| 3202236 | 3/1983 | Fed. Rep. of Germany. | |
| 2038458 | 1/1971 | France. | |
| 7103019 | 10/1971 | France. | |
| 2246205 | 4/1975 | France. | |
| 640323 | 12/1983 | Switzerland. | |
| 0765542 | 9/1980 | U.S.S.R. | 384/319 |

Primary Examiner—Robert E. Garrett
Assistant Examiner—Thomas Denion
Attorney, Agent, or Firm—Thomas W. Speckman; Douglas H. Pauley

[57] ABSTRACT

The very high pressure piston pump can compress a conveying agent (20) to a pressure of approximately 22 kbar. The high pressure sealing comprises a pressure-compensated ice sealing, which operates free of leakage and with reduced friction. To reduce the generally very high frictional forces in the ice sealings, a rotation is superimposed on the translation of the piston (10). The entire machine may be regulated by means of a microprocessor, depending upon the operational parameters and the feed efficiency. Its very high pressure seal has a long service life, even under continued operation in very high pressure ranges.

13 Claims, 1 Drawing Sheet

VERY HIGH PRESSURE PISTON PUMP

BACKGROUND OF THE INVENTION

1. Field of the Invention

The present invention relates to a very high pressure piston pump, with which water, and upon addition of corresponding separating devices, other media as well, can be condensed to pressures in the range of about 22 kbar. Such high pressure piston pumps are now used, especially for water jet cutting by "jet-cutting" processes. Jet-cutting is a very versatile and widely used cutting method, both for very soft and for very hard materials. For example, textiles, corrugated cardboards, plastics, composite fiber materials, and other relatively weak materials can be cut by means of jet-cutting, since, by this method, particularly clean cutting edges of large piles of materials can be attained. One further decisive advantage of this cutting is that only one nozzle needs to be spatially directed and controlled, and no expensive stamping and cutting tools are necessary. Changes in cutting require only one alteration of the control program. With jet-cutting, the cutting of three-dimensional forms is no problem.

2. Description of the Prior Art

The high pressure piston pumps used today for jet-cutting compress the conveying agent, for example, water, to a pressure of about 3000 to 5000 bar. They must be dismantled every 300 to 500 operational hours to replace the piston packings, which are subjected to severe wear. Previously, feed pressures of up to a maximum of 12 kbar could be attained. In such types of highly stressed high pressure piston pumps, the service lives of the high pressure piston packings amount to only about 20 minutes. This limitation determines the present status of jet-cutting. Because of the service life of the high pressure packings, which decreases with increasing feed pressure, the jet-cutting devices used today in industry are only used to a high pressure of about 5 kbar. Intervals of approximately 300 hours between changes of the high pressure piston packings, which are still very short, are a great disadvantage of this cutting technology. Jet-cutting devices are therefore frequently equipped with two high pressure piston pumps, which are alternately operated and serviced. Restrictions on the feed pressure of the currently available jet-cutting devices to about 5 kbar decisively limit the opportunities for their application. Thus, it is not possible, for instance, to effectively and cleanly cut sheet metal or rocks with jet-cutting devices. The use of jet-cutting would be very desirable in cutting sheet metal, since the border areas would not be thermally influenced, as is the case, for example, with laser cutting. Entirely new applications in rock drilling technology may be available through the use of jet-cutting at pressures in the range of 10 kbar and above.

Apart from jet-cutting, such high pressure piston pumps can be used in other areas, such as, for example, in physical chemistry, for determining the characteristics of substances; as catalyst pumps, as pumps for the fretting of pipes; and for other applications.

Ice sealings are fundamentally well known, and are in fact described in the following five patents:

French Patent No. 2,077,144;
French Patent No. 2,038,458;
U.S. Pat. No. 3,333,907;
German Publication No. DE-B 1,229,801;
U.S. Pat. No. 3,612,713.

In all these devices, only pressures, at the most, of a few hundred bar can be sealed. In Swiss Patent No. 640,323, an ice sealing for pressures of over 1000 bar is described. For physical reasons, it is not possible, however, to seal against a pressure higher than 2080 bar. At this pressure, a phase transition takes place in the ice: ice I, with its hexagonal lattice, makes a transition into ice III, with its tetragonal lattice, and the density of the ice is thereby increased by 18 percent. This means that the gap between the piston and cooled casing is increased by about 18 percent. Through the elastic expansion of the casing as the result of the pressure in the conveying space, this gap is likewise increased. Both these parts of the gap expansion cannot be compensated rapidly enough, even with greater cooling, and the seal is broken. Furthermore, the frictional forces arising in this ice sealing are very high in a relatively large range of pressure and piston positions, and therefore make impossible an economical utilization of the same, as demonstrated in ETH-Dissertation number 8015.

SUMMARY OF THE INVENTION

It is an object of the present invention to significantly expand the applications for jet-cutting, by creating a very high pressure piston pump with an ice sealing, which compresses the conveying agent to pressures higher than previously obtainable and by ensuring a significantly longer service life of the very high pressure sealing in comparison with those currently known, with no more leakage in the high pressure sealing.

This objective is achieved by a very high pressure piston pump which is movable in a sealing manner in a casing, by means of an ice layer provided between the piston and casing in which the piston or casing, or both, can be cooled, which is characterized in that the internal diameter of the casing can be varied by means of a pressure medium which engages in or around the casing, or that the external diameter of the piston can be varied by means of a pressure medium engaging in the interior of the piston, and that the piston, for the purpose of reducing the translational frictional forces, can be rotated.

BRIEF DESCRIPTION OF THE DRAWING

One embodiment of the very high pressure piston pump in accordance with the invention is illustrated in the figure which shows the following.

DESCRIPTION OF PREFERRED EMBODIMENTS

Figure 1:
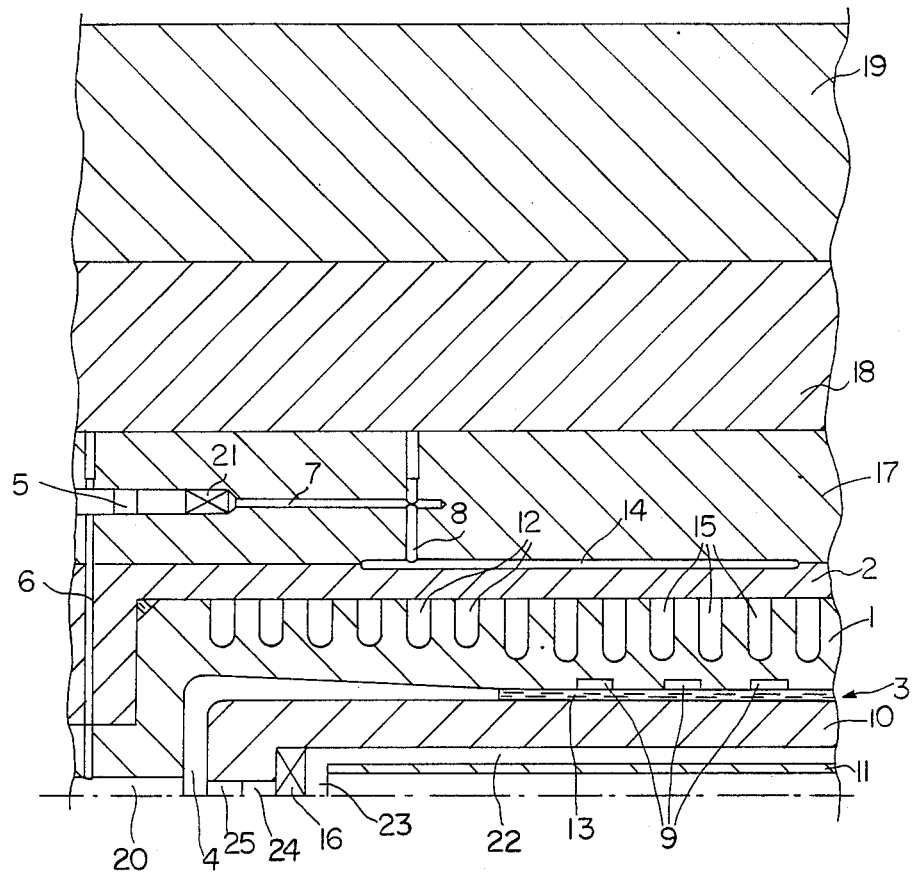
FIG. 1: A principal cross-sectional view through the high pressure sealing components of a high pressure piston pump.

Ice (13) in the sealing area (3) is cooled from the outside by means of casing (1), and the internal diameter of casing (1) varies. Piston (10), which may be constructed in a prismatic form with a variable cross section in its sealing area, may be, for example, driven either hydraulically or mechanically. The rotation of piston (10) is advantageously provided by means of an electrical motor, which can be integrated into the drive hydraulics. The piston of the very high pressure pump can be coaxially connected with the piston rod of a hydraulic drive. It is so contemplated to build the piston of this hydraulic drive so that it can be operated as the rotor of a canned electric motor, the stator of the electric motor surrounding the cylinder of the hydraulic drive. The border zone of piston (10) may comprise materials having different temperature conductivities, in order, in the zones of higher frictional forces, to transfer instantaneous and local heat to the ice (13), and, in zones of excessive water film between the ice (13) and the piston (10), to remove heat from the ice (13) locally and instantaneously. The piston (10) is surrounded by conveying agent (20) in sealing area (3) of ice (13) and in compression space (4). Tube (11), which conducts the cooling or heating medium away from piston (10), is located in the interior of piston (10). To reduce the frictional forces during the suction stroke, and to reduce the level of the water film during the compression stroke, the temperature of the medium which is conveyed through tube (11) to the piston (10) may be periodically varied synchronously with the piston movement. The ice (13) in sealing area (3) adheres to casing (1). It is cooled by cooling medium circulating in helical grooves (15) of casing (1). Circular grooves (12) restrict the heat flow from compression space (4) into sealing area (3), and impede ice formation in compression space (4). For the same reasons, the inlet and outlet valves are advantageously positioned outside the very high pressure piston pump. Recesses (9), which are filled with a compressible medium, permit a gradual reduction of the pressure in the ice sealing. This measure reduces the required sealing length during high pressure operation. Casing (2), which can be stressed with pressure in intermediate space (14) through the pressure medium, is heat shrunk onto the casing (1). The wall thickness of casing (2) is preferably as thin as possible in the area of sealing length (3), and casing (2) is preferably constructed with the minimum rigidity and thermal conductivity possible, to attain an optimal pressure compensation of casing (1) and a slight heat flow from casing (17) to casing (1). Casing (2) may be, for example, connected with heat shrunk casing (17) by means of an electron beam weld outside the sealing area. Casing (17) is, in this example, provided with bores (6, 7 and 8), in order to vary the internal diameter of casing (1). Blocking element (5), which is formed in this example as a stopper, prevents the conveying agent (20) from penetrating into intermediate space (14). This blocking element may comprise a membrane or a siphon which is filled with a fluid heavier than the conveying agent and the pressure medium. Control element (21), depending upon the pressure of conveying agent (20) in compression space (4) and additional parameters, controls the variation of the internal diameter of casing (1) in sealing area (3). Cylinders (18 and 19) are autofretted to accommodate the high internal pressure. The cooling of casing (1), the heating and cooling of piston (10), and the variation in the pressure of the pressure medium, are controlled by a microprocessor depending upon feed performance and operational parameters.

An embodiment is also possible in which pressure compensation takes place by varying the piston's diameter, in which piston (10) comprises the sealing blocking element (25), and, by means of bore (24) and control element (16), varies the pressure of the pressure medium in hollow space (23). An embodiment is likewise possible in which the primary cooling takes place through the cooling medium flowing in the piston (10), and in which the pressure compensation further takes place through the pressure medium in intermediate space (14).

By using this very high pressure piston pump, the applications of jet-cutting may be considerably expanded. The service lives of the very high pressure sealing area of the present very high pressure piston pump amount to several thousand hours. As a result, the economical features of jet-cutting are considerably improved, and materials can be cut for the first time in this manner, which up until now had to be handled differently. In rock drilling technology, this very high pressure piston pump allows, for example, the creation of a new generation of mining, gallery-digging, and tunnel-boring systems.

I claim:

1. A very high pressure piston pump, comprising a piston (10), the piston (10) is movable in a sealing manner in a casing (1) with an ice layer positioned between the piston (10) and the casing (1), at least one of the piston (10) and the casing (1) can be cooled, an internal diameter of the casing (1) is variable with a first pressure medium engaging near the casing (1); and an external diameter of the piston (10) is variable with a second pressure medium engaging in an interior of the piston (10), and the piston (10) is rotatable in the casing (1) in order to reduce translational frictional forces.

2. A very high pressure piston pump in accordance with claim 1, wherein the internal diameter of the casing (1) is variable by the first pressure medium, and the casing (1) is surrounded by two external casings (2, 17), the external casings (2, 17) mesh with one another forming an intermediate space (14) between the external casings (2, 17) in a sealing area (3) of the casing (1), the intermediate space (14) is filled with the first pressure medium; the intermediate space (14) communicates with a compression space (4) through bores (6, 7, 8), one of the bores (6, 7, 8) contains a blocking element (5) which prevents penetration of a conveying agent (20) into the intermediate space (14); and the variable internal diameter of the casing (1) is controllable with a control element (21), the control element (21) is in communication with the bores (6, 7, 8), the control element (21) varies an intermediate space pressure of the first pressure medium in the intermediate space (14) depending upon a conveying agent pressure of the conveying agent (20) in the compression space (4).

3. A very high pressure piston pump in accordance with claim 1, wherein the external diameter of the piston (10) is variable, and a hollow space (23) is located within an interior (22) of the piston (10), the hollow space (23) is filled with the second pressure medium; the hollow space (23) is in communication with a compression space (4) through a bore (24), the bore (24) contains a sealing blocking element (25) which prevents the penetration of a conveying agent (20) into the hollow space (23); and variation of the external diameter of the piston (10) is controllable with a control element (16), the control element (16) varies a hollow space pressure of the second pressure medium in the hollow space (23) depending upon a conveying agent pressure of the conveying agent (20) in the compression space (4).

4. A very high pressure piston pump in accordance with claim 1, wherein the piston (10) is rotated with an electrical motor, the electrical motor is controllable by a microprocessor, and a primary parameter of control is a gradient of a measured translational frictional force of the piston (10).

5. A very high pressure piston pump in accordance with claim 1, wherein the sealing manner between the piston (10) and the casing (1) is arranged in several layers, and in at least one of an internal wall of the casing (1) and an external wall of the piston (10), at least one rotationally symmetrical recess (9) is filled with compressible media and positioned at specific distances.

6. A very high pressure piston pump in accordance with claim 1, wherein at least one of a first border zone of an external wall of the piston (10) and a second border zone of an internal wall of the casing (1) comprise materials having different thermal conductivities.

7. A very high pressure piston pump in accordance with claim 1, wherein the casing (1) further comprises a plurality of helical grooves (15) and a heat transfer medium is circulated through the helical grooves (15).

8. A very high pressure piston pump in accordance with claim 1, wherein the casing (1) in an area of a compression space (4) has circular grooves (12) to prevent a conveying agent (20) from freezing in the compression space (4).

9. A very high pressure piston pump in accordance with claim 2, wherein a blocking element (25) comprises at least one of a stopper, a membrane, and a siphon, and the blocking element (25) is filled with a fluid heavier than the conveying agent (20) and the pressure medium.

10. A very high pressure piston pump in accordance with claim 1, wherein heat transfer of at least one of the piston (10) and the casing (1), the rotation of the piston (10), and variable pressure of each pressure medium is controllable by a microprocessor depending upon operational parameters and feed efficiency.

11. A very high pressure piston pump in accordance with claim 3, wherein the blocking element (25) comprises at least one of a stopper, a membrane, and a siphon, and the blocking element (25) is filled with a fluid heavier than the conveying agent and the pressure medium.

12. A very high pressure piston pump in accordance with claim 1, wherein the piston (10) further comprises a hollow space (22, 23), a tube (11) protruding into the hollow space (22, 23) and a heat transfer medium circulating through the tube (11) and the hollow space (22, 23).

13. A very high pressure piston pump in accordance with claim 1, wherein at least one of the piston (10) and the casing (1) which does not contribute to primary cooling, can be cooled and heated independent of the permanent cooling of the adjacent piston (10) or the adjacent casing (1).

* * * * *